US005826797A

United States Patent [19]
Kah, III

[11] Patent Number: 5,826,797
[45] Date of Patent: *Oct. 27, 1998

[54] OPERATIONALLY CHANGEABLE MULTIPLE NOZZLES SPRINKLER

[76] Inventor: Carl L. C. Kah, III, 1640 Australian Ave., Riviera Beach, Fla. 33404

[ * ] Notice: The terminal 10 months of this patent has been disclaimed.

[21] Appl. No.: 405,033

[22] Filed: Mar. 16, 1995

[51] Int. Cl.$^6$ .......... A61C 31/02

[52] U.S. Cl. .......... 239/394; 239/391

[58] Field of Search .......... 239/390, 391, 239/393, 394, 436, 71, 74, 242

[56] References Cited

U.S. PATENT DOCUMENTS

| | | | |
|---|---|---|---|
| 3,094,283 | 6/1963 | Balister | 239/393 |
| 4,235,379 | 11/1980 | Beamer | 239/390 X |
| 4,867,378 | 9/1989 | Kah, Jr. | 239/206 |
| 5,098,021 | 3/1992 | Kah, Jr. | 239/242 |
| 5,104,045 | 4/1992 | Kah, Jr. | 239/246 |
| 5,141,157 | 8/1992 | Han et al. | 239/242 X |
| 5,226,599 | 7/1993 | Lindermeir et al. | 239/205 |

FOREIGN PATENT DOCUMENTS

| | | | |
|---|---|---|---|
| 2313132 | 12/1976 | France | 239/394 |
| 975101 | 11/1982 | U.S.S.R. | 239/390 |

*Primary Examiner*—Robert J. Oberleitner
*Assistant Examiner*—C. T. Bartz
*Attorney, Agent, or Firm*—Jack N. McCarthy

[57] ABSTRACT

An oscillatable nozzle sprinkler with operationally changeable nozzles from the top. One configuration consists of a multiple nozzle cylindrical sleeve which allows a desired nozzle for flow rate and trajectory to be rotationally selected while the sprinkler is operating. Another configuration allows individual nozzles to be inserted into the top of the sprinkler housing while the sprinkler is operating.

19 Claims, 3 Drawing Sheets

OPERATIONALLY CHANGEABLE MULTIPLE NOZZLES SPRINKLER

DESCRIPTION

1. Technical Field

This invention relates to oscillatable sprinklers with multiple nozzles of different flow rates and discharge trajectories that can be selectably changed when the sprinkler is installed and operating.

2. Background Art

In U.S. Pat. No. 5,098,021 an integrated system is set forth for varying the flow rate of a single nozzle to meet precipitation rate requirements for varying arcs of oscillating coverage. No provision is provided to correct the flow rate of the nozzle for varying ranges when using a nozzle stream break-up screw to limit the nozzle range.

U.S. Pat. No. 5,104,045 relates to sprinkler nozzles having flow passages for obtaining desired precipitation coverage. This patent shows how nozzles are typically installed and retained in oscillating sprinkler nozzle housings.

U.S. Pat. No. 4,867,378 shows a sprinkler device for directing a flow of water therefrom having a single nozzle in a nozzle housing assembly, said sprinkler having an output drive shaft.

Other sprinklers in the market place have separate nozzles of different flow rates or trajectories but can only be installed into the sprinkler nozzle housing when the sprinkler is not operating. In order to change to a new desired nozzle the undesired nozzle which was installed in the sprinkler's nozzle housing must also be removed before the new desired replacement nozzle can be installed.

DISCLOSURE OF INVENTION

It is an object of this invention to make it possible to select a nozzle for the desired range and flow rate to provide the desired precipitation rate while the sprinkler is operating. This is accomplished by molding or inserting various nozzles around the circumference of a cylinder which is rotationally mounted on the nozzle housing. The desired nozzle can be rotated into the flow path while the sprinkler is operating if it is desired to change the range and/or flow rate of the sprinkler. After installation if it is found that a local area of the yard needs more or less water from that of the other sprinklers running in that irrigation zone it is only necessary to rotate the multiple nozzle selection sleeve, or cylinder, to a different flow rate or trajectory nozzle as indicated around the top circumference of the nozzle selection sleeve to provide an increased or decreased precipitation for this area of the yard.

Also, the sprinkler may be shut off at the sprinkler by turning the nozzle selection cylinder to a blank rotational location indicated as off.

An alternate configuration is also shown which also allows the nozzle to be changed during operation from the top and behind the stream, but has the disadvantage that the other nozzles must be carried separately and are not present on the sprinkler at all times and immediately available after installation.

This concept makes it simple to locally increase or decrease the sprinklers flow rate to better match the precipitation to varying soil or sun light conditions after the installation has been completed and the landscaping has stabilized.

Optimum water usage can thus be more easily achieved. The easy removal of the nozzle selection sleeve also makes cleaning of dirt or debris from the nozzle easy compared to other sprinklers now on the market and can be done without having to shut the system off and then turned back on after the nozzle has been cleaned.

BEST MODE FOR CARRYING OUT INVENTION

Figure 1:
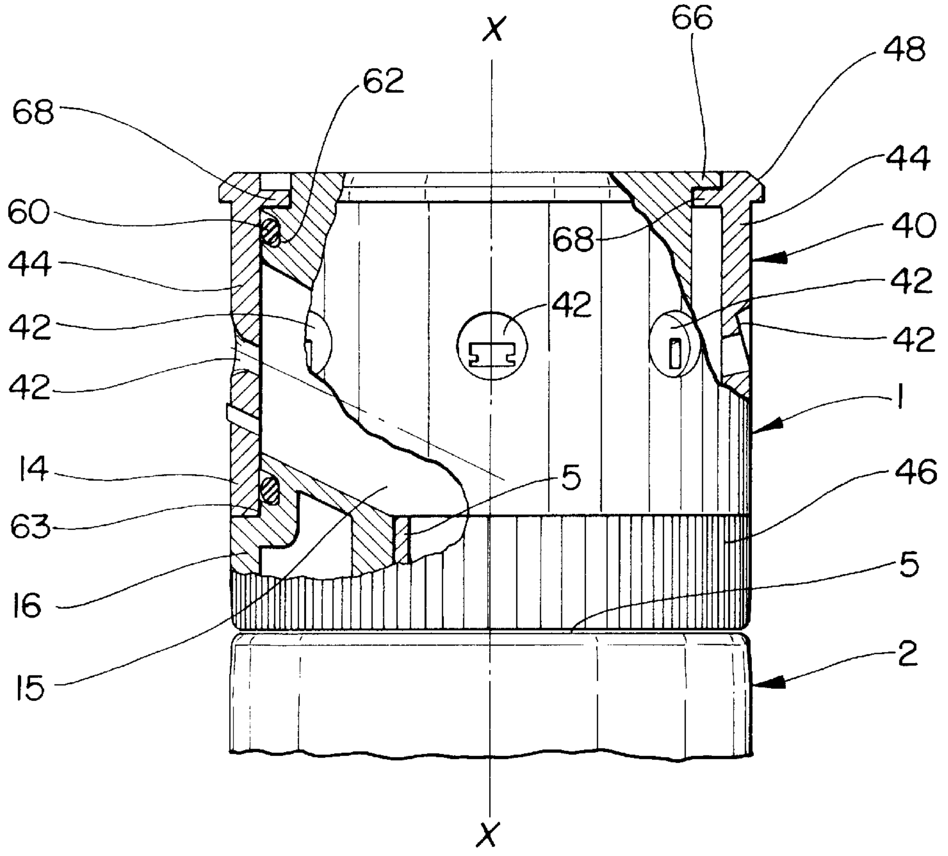
FIG. 1 is a fragmentary sectional side view of a rotatable sprinkler nozzle housing assembly being driven by an output shaft and showing the rotationally mounted multiple nozzle selection sleeve.
Figure 2:
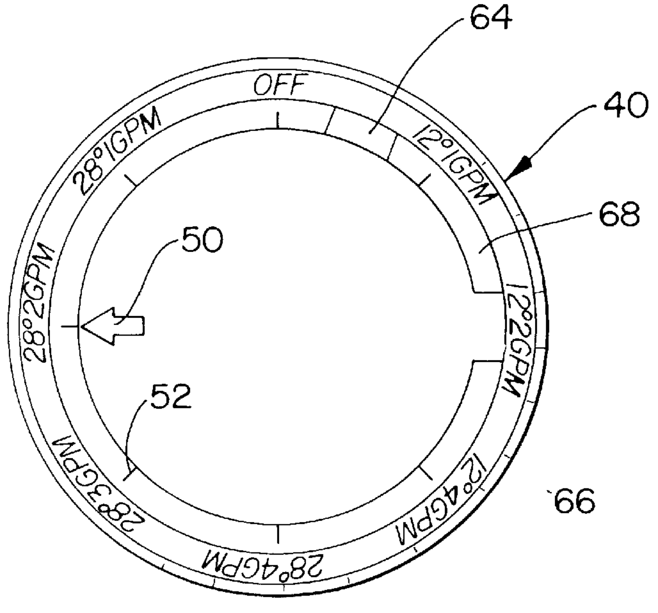
FIG. 2 is a top view of the nozzle housing assembly showing the nozzle identification around the top circumference of the nozzle selection sleeve. Also the removal slot and retention lug can be seen for retaining or allowing removal of the nozzle selection sleeve from the nozzle housing assembly.

Referring to FIG. 1 and FIG. 2 of the drawings, a rotatable nozzle sprinkler is shown having a cylindrical nozzle housing assembly 1 mounted for rotation about axis x—x on the top of a riser assembly 2. The riser assembly has a center shaft opening at its upper end for the nozzle housing assembly drive shaft 5 to exit the riser assembly 2 and be connected to the nozzle housing assembly 1.

The nozzle drive shaft 5 is hollow and water is supplied to the nozzle housing 16 through the hollow center passage of the nozzle drive shaft 5 into a flow passage 15 in the nozzle housing 16. Water enters the riser assembly 2 at its lower end and is used to power a rotary drive mechanism for turning the nozzle drive shaft 5 before exiting the riser assembly through the hollow center passage of the nozzle drive shaft 5.

The nozzle housing 16 flow passage 15 extends through the nozzle housing 16 to the outside of the nozzle housing at an upward angle. The constructions of a nozzle housing with a flow passage is shown in U.S. Pat. No. 5,098,021 and U.S. Pat. No. 5,104,045.

The flow passage 15 in the nozzle housing does not determine the sprinkler's stream trajectory for this design. A separate nozzle selection cylindrical sleeve 40 which is rotationally mounted on the nozzle housing 16 has multiple individual nozzles 42 molded into the sleeve wall 44. Each nozzle can be separately configured to give a desired trajectory angle and sized to provide a desired flow rate.

The nozzle selection sleeve can be easily molded with each nozzle shape being determined by the shape of the end of individual core pins located radially around the mold's sleeve cavity. Also their entry angle into the sleeve cavity can be used to determine the nozzle trajectory. These core pins can be loaded out and cammed into molding position when the mold is closed to the molding position. Thus this design lends itself to mass production. The inside surface is the sleeve wall and serves as the upstream surface of the sharp edge nozzle passages. This is a satisfactory sharp edge orfice configuration for sprinkler nozzle ranges of 40 feet and less. If a contour on the upstream side of the nozzles is required the nozzles requiring this may be inserted and sonic welded or solvent welded into place or a more complicated plastic injection molding tool can be fabricated with short travel cores around the inside of the sleeve to also provide upstream contour for the nozzles which require it. The nozzle selection sleeve is shown separately in FIG. 5.

The nozzle selection sleeve 40 is rotated by holding the lower portion of the nozzle housing 46 while turning the nozzle selection sleeve 40 with rim 48 until the position selection arrow 50 points to the proper alignment line 52 on the top ring area 68 of the nozzle selection sleeve 40.

The flow passage 15 of nozzle housing 16 is pressure sealed to the rotational nozzle selection sleeve 40 by an "O" ring 60 in groove 62 which is molded into the nozzle housing 16 around the flow passage 15 opening to the outside of the nozzle housing 16. Obviously, the "O" ring or any other cross sectionally shaped seal (60 in FIG. 1 and 80 in FIG. 3) bears against the inner surface of the nozzle selection sleeve (40 in FIG. 1 and 80 in FIG. 3) to assure positive sealing around the discharge end of the passage 15 and 15' respectively. This assures that the water intended to be discharged through the orifice or nozzle for sprinkling purposes is not adversely affected and water will not leak internally in the nozzle housing which would adversely impact the sprinkler. This can be done by putting the "O" ring groove 62 shape on the sliding core of the plastic injection molding tooling that generates the side hole of flow passage 15 in the nozzle housing 16.

The nozzle selection sleeve 40 can be retained on the nozzle housing 16 by lip 66 which over hangs rim 68 of the nozzle selection sleeve 40. The nozzle selection sleeve 40 may be removed from the nozzle housing 16 by rotating it to the position where notch 64 in rim 68 under lies lip 66 and the nozzle selection sleeve 40 can then be removed or put onto the nozzle housing 16. Taper 63 on the inside circumference bottom edge of the nozzle selection sleeve allows the sleeve to move over the "O" ring seal during installation.

Figure 5:
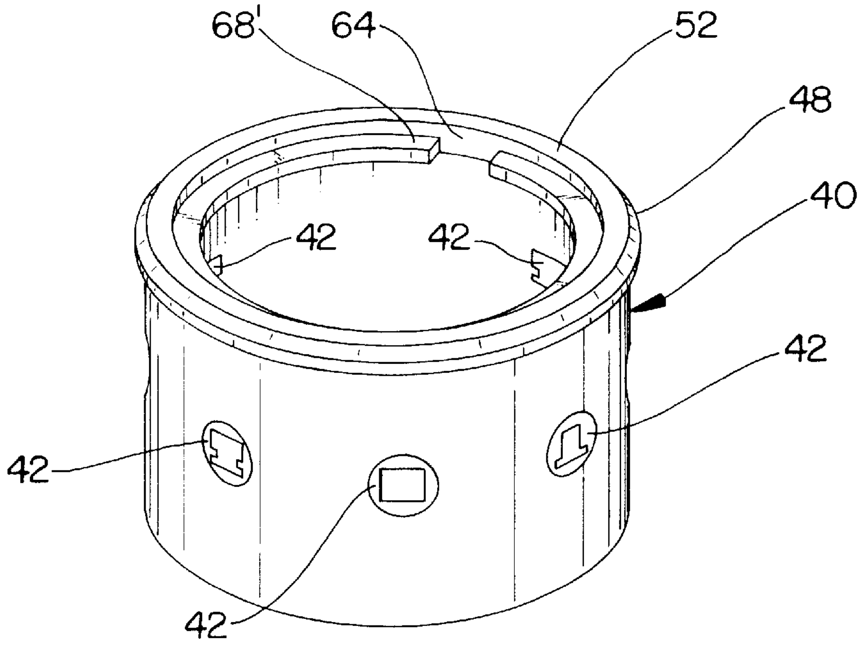
FIG. 5 shows the multiple nozzle selection sleeve removed from the nozzle housing.

The nozzle selection sleeve 40 is shown removed from the nozzle housing in FIG.5. Different sleeves with different nozzles selections can be provided for the same sprinkler.

Figure 3:
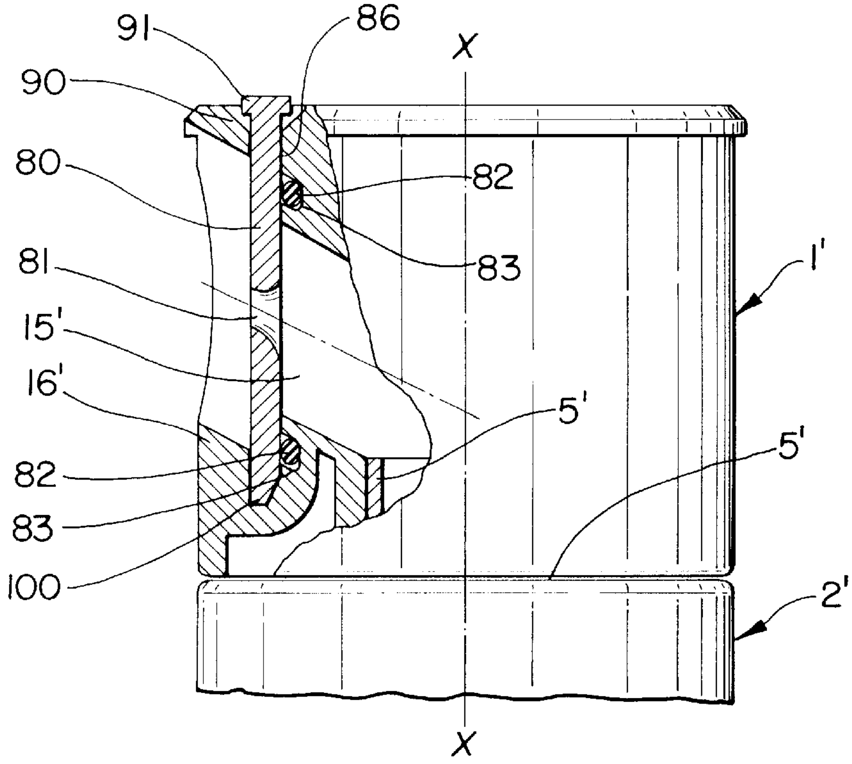
FIG. 3 is a fragmentary sectional side view of a rotatable sprinkler nozzle housing assembly showing a nozzle insert plate removable and insertable from the top.
Figure 4:
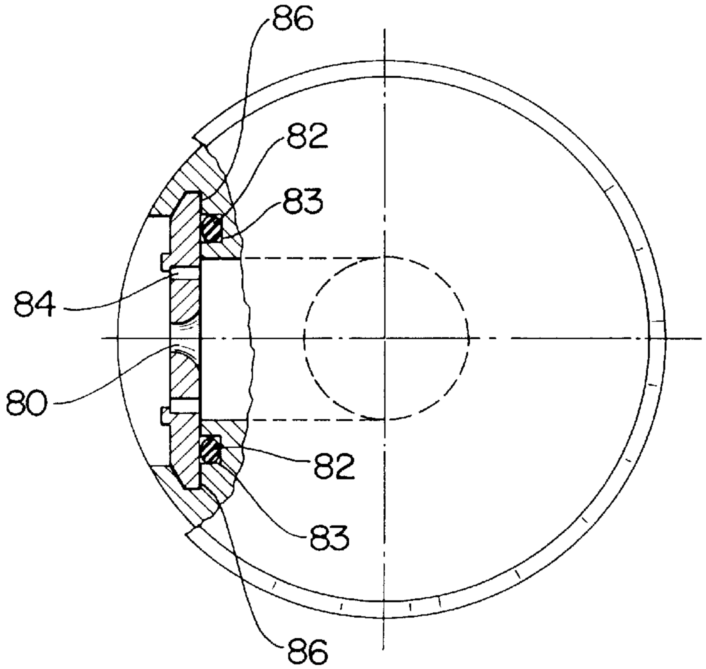
FIG. 4 is a top view with a cut away of the nozzle housing assembly showing the removable nozzle insert plate in position.

An alternate configuration is shown in FIG. 3 and FIG. 4 in which the nozzle may also be changed from the top of the sprinkler with the sprinkler operating.

Referring to FIG. 3 and 4 of the drawings a rotating nozzle sprinkler housing is shown having a cylindrical nozzle housing assembly 1' mounted for rotation about axis x—x on the top of a riser assembly 2'.

The nozzle assembly 1' is rotated and supplied with water through hollow drive shaft 5'. The nozzle housing 16' flow passage 15' is supplied with pressurized water from the hollow nozzle drive shaft 5' and is sealed to an insertable nozzle 84 and plate 80 with nozzle 81 by "O" ring 82 in groove 83 the nozzle housing 16' flow passage 15'.

The nozzle plate slides down into groove 86 of the nozzle housing 16' and is pressed against the nozzle "O" ring seal 82 which is compressed slightly as the lead in taper 100 of the nozzle plate passed the "O" ring seal 82.

The nozzle plate is removable from the top of the nozzle housing by putting a screwdriver or sprinkler key into recess 90 and lifting the nozzle plate by edge 91.

Figure 6:
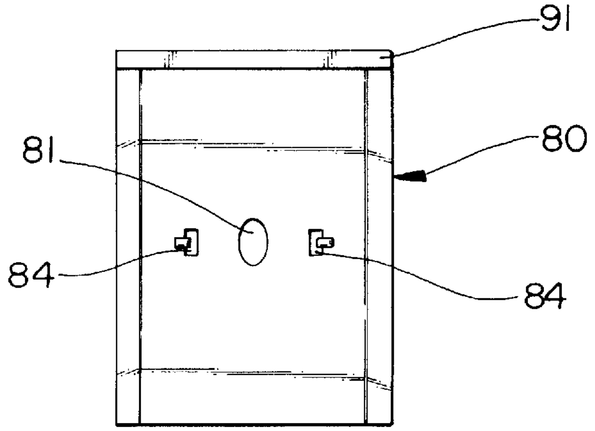
FIG. 6 shows a nozzle insert plate.

A nozzle plate is shown removed from the nozzle housing in FIG. 6.

I claim:

1. A sprinkler having a rotatable nozzle housing; an output shaft mechanically connected to said rotatable nozzle housing for rotating said nozzle housing, a manually adjustable rotatable sleeve having an inner surface and a plurality of circumferentially spaced orifices; said rotatable sleeve is slidably installed around the nozzle housing and being in rotational relationship therewith and thereto; sealing means surrounding the discharge end of a water passage formed in said nozzle housing; said sealing means including a seal member surrounding the discharge end of the water passage and dimensioned to continuously bear against said inner surface to provide a sealed connection to the pressurized water passage of the nozzle housing, wherein said rotatable sleeve is selectively positioned to align one of said plurality of orifices with said discharge end of the water passage for distributing water outwardly from said sprinkler, and means for retaining said nozzle selection sleeve in place.

2. A sprinkler as claimed in claim 1 including nozzle means in said manually adjustable rotatable sleeve.

3. A sprinkler as claimed in claim 1 wherein each orifice of said plurality of orifices are configured to provide a different desired flow characteristic.

4. A sprinkler as claimed in claim 3 wherein said sealing means is an "O" ring.

5. A sprinkler as claimed in claim 3 wherein said rotatable nozzle housing is cylindrical and includes an outer surface, said separate rotatable sleeve is dimensioned so that the outer diameter thereof is substantially equal to the said outer surface of said rotatable nozzle housing.

6. A sprinkler as claimed in claim 3 wherein a portion of said separate rotatable sleeve is blank so that said separate rotatable sleeve is selectively positioned so that said blank overlies said discharge end of said water passage whereby said sprinkler is capable of being turned off without turning off the water supply.

7. A sprinkler as claimed in claim 6 wherein said rotatable nozzle housing includes a reduced diameter surface, said inner diameter surface of said rotatable sleeve being in slidable relationship with said reduced diameter surface of said rotatable nozzle housing.

8. A sprinkler as claimed in claims 7 including a riser assembly operatively connected to said rotatable nozzle housing, said riser assembly including a cylindrical member having an outer diameter, the outer diameter of said separate rotatable sleeve being substantially equal to the diameter of said outer diameter of said cylindrical member.

9. A sprinkler as set forth in claim 3 wherein said rotatable nozzle housing includes indicia on the top indicating the location of each orifice of said plurality of orifices and/or its flow characteristic.

10. A sprinkler as claimed in claim 3 wherein said separate rotatable sleeve is slidably installed from the top of said sprinkler.

11. A sprinkler as claimed in claim 1 wherein said nozzle housing includes an outer surface, gripping means formed on said outer surface to hold said nozzle housing from rotating when said sleeve is rotated.

12. A sprinkler having a rotatable nozzle housing having a central axis about which said rotatable nozzle housing rotates; a relatively flat nozzle plate having a front side, a back side, a top edge, a bottom edge and opposing side edges; at least one orifice disposed in said nozzle plate aligning with a water passage formed in said rotatable nozzle housing for discharging water from the side of said rotatable nozzle housing at a given characteristic, said nozzle plate slidably fitting into a complementary groove formed in said rotatable nozzle housing and disposed generally parallel to said central axis, said front side having a planar surface facing the discharge end of said water passage, sealing means surrounding said discharge end of said water passage formed in said nozzle housing; said sealing means including a seal member surrounding the discharge end of the water passage and dimensioned to continuously bear against said planar surface to provide a sealed connection to the pressurized water passage of the nozzle housing, means on the top edge of said nozzle plate accessible from the top of said rotatable nozzle housing wherein said nozzle plate is removable while said sprinkler is operational for insertion of other nozzle plates with different orifices having different flow characteristics.

13. A sprinkler as claimed in claim 12 wherein said seal member is an "O" ring.

14. A sprinkler as claimed in claim 12 including a tapered recess formed at one end of said groove and a mating tapered portion formed on said bottom edge and said back side to urge said nozzle plate against said seal member.

15. A sprinkler as claimed in claim 12 including a riser operatively connected to said rotatable nozzle housing, said riser and said nozzle housing being cylindrically shaped and the outer diameter of said riser and the outer diameter of said nozzle housing being substantially equal.

16. A water sprinkler having a riser assembly, a drive shaft extending from the top of said riser assembly, a nozzle housing assembly, said nozzle housing assembly having a housing connected to said drive shaft for rotation therewith, said nozzle housing assembly having a cylindrical outer surface, a cylindrical nozzle selection sleeve being mounted over the outer surface of said housing to rotate therewith and being manually rotated relative to said housing, said nozzle selection sleeve having a sleeve wall with a multiplicity of individual nozzles spaced therearound, said housing having a flow passage therein with an exit at said cylindrical outer surface, said individual nozzles being positioned on said sleeve wall so that each nozzle becomes aligned with said flow passage exit as the nozzle selection sleeve is rotated.

17. A water sprinkler as claimed in claim 16 wherein each of said individual nozzles includes a sharp edged orifice formed therein in the process of molding the nozzle selection sleeve.

18. A water sprinkler as claimed in claim 16 including sealing means surrounding said flow passage exit to provide a sealed connection to the pressurized water passage of the nozzle housing.

19. A water sprinkler as claimed in claim 18 wherein said sealing means includes an "O" ring.

* * * * *

US005826797C1

(12) REEXAMINATION CERTIFICATE (4305th)

United States Patent

(10) Number: US 5,826,797 C1

(45) **Certificate Issued: *Apr. 3, 2001**

Kah, III

(54) OPERATIONALLY CHANGEABLE MULTIPLE NOZZLES SPRINKLER

(75) Inventor: Carl L. C. Kah, III, 1640 Australian Ave., Riviera Beach, FL (US) 33404

(73) Assignee: Carl L. C. Kah, III, Riviera Beach, FL (US)

Reexamination Request:

No. 90/005,526, Oct. 4, 1999

Reexamination Certificate for:

Patent No.: 5,826,797
Issued: Oct. 27, 1998
Appl. No.: 08/405,033
Filed: Mar. 16, 1995

( * ) Notice: This patent is subject to a terminal disclaimer.

(51) Int. Cl.$^{7}$ ........................................ B05B 1/16

(52) U.S. Cl. ........................................ 239/394; 239/391

(58) Field of Search ........................................ 239/390, 391, 239/393, 394, 436, 71, 74, 242

(56) References Cited

U.S. PATENT DOCUMENTS

| | | | | |
|---|---|---|---|---|
| 2,388,093 | * | 10/1945 | Smith | 239/394 |
| 2,790,680 | * | 4/1957 | Rosholt | 239/394 |
| 3,083,872 | * | 4/1963 | Meshberg | 239/394 |
| 3,094,283 | * | 6/1963 | Balister | 239/393 |
| 4,235,379 | * | 11/1980 | Beamer | 239/250 |
| 4,784,325 | * | 11/1988 | Walker et al. | 239/204 |
| 4,867,378 | * | 9/1989 | Kah | 239/206 |
| 5,098,021 | * | 3/1992 | Kah | 239/242 |
| 5,104,045 | * | 4/1992 | Kah | 239/246 |
| 5,125,578 | * | 6/1992 | Ballu | 239/394 |
| 5,141,157 | * | 8/1992 | Han et al. | 239/206 |
| 5,226,599 | * | 7/1993 | Lindermeir et al. | 239/205 |

* cited by examiner

*Primary Examiner*—Lesley D Morris

(57) ABSTRACT

An oscillatable nozzle sprinkler with operationally changeable nozzles from the top. One configuration consists of a multiple nozzle cylindrical sleeve which allows a desired nozzle for flow rate and trajectory to be rotationally selected while the sprinkler is operating. Another configuration allows individual nozzles to be inserted into the top of the sprinkler housing while the sprinkler is operating.

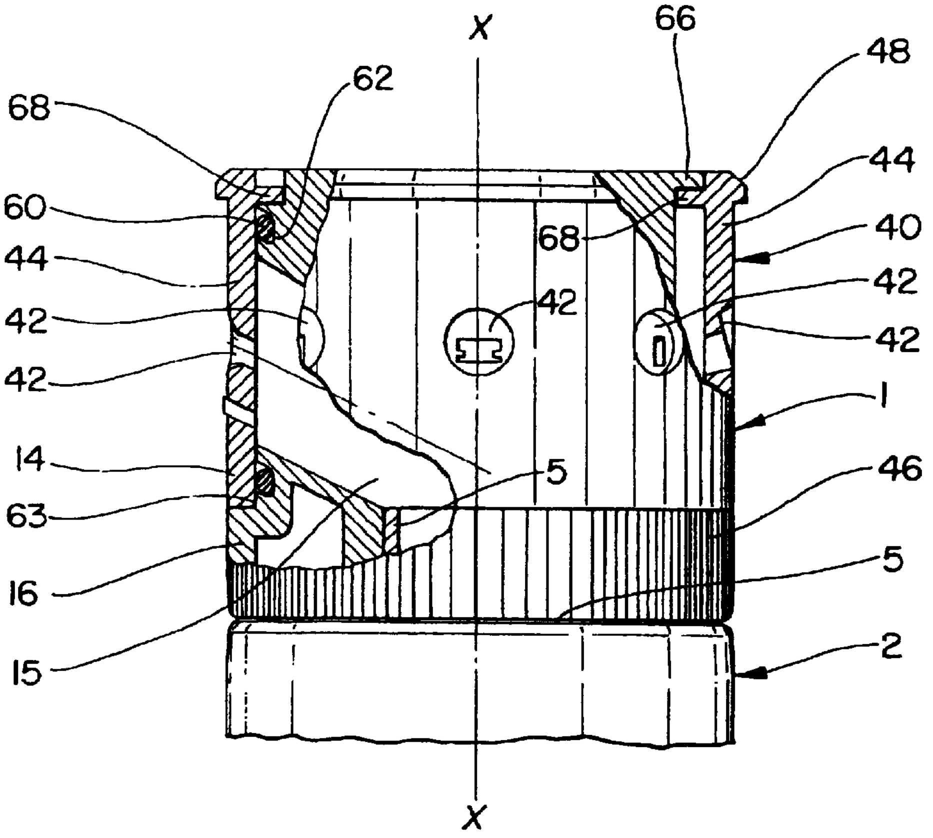

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 12–15 is confirmed.

Claim 3 is cancelled.

Claims 1, 4–11, 16 and 18 are determined to be patentable as amended.

Claims 2, 17 and 19, dependent on an amended claims are determined to be patentable.

New claims 20 and 21 are added and determined to be patentable.

1. A sprinkler [having] *comprising:* a rotatable nozzle housing *having a water passage formed therein*;

an output shaft mechanically connected to said rotatable nozzle housing for rotating said nozzle housing[,]*;* a manually adjustable rotatable sleeve having an inner surface and a plurality of circumferentially spaced [orifices;] *nozzles, each of said nozzles having mutually different configurations from each other,* said rotatable sleeve [is] *being* slidably installed around the nozzle housing and being in rotational relationship therewith and thereto *so that said rotatable sleeve can be selectively positioned to align one of said plurality of nozzles with the discharge end of the water passage for distributing water outwardly from said sprinkler*;

sealing means surrounding the discharge end of [a] *the* water passage formed in said nozzle housing[;], said sealing means including a seal member surrounding the discharge end of the water passage and dimensioned to continuously bear against said inner surface *of said rotatable sleeve* to provide a sealed connection to the pressurized water passage of the nozzle housing[, wherein said rotatable sleeve is selectively positioned to align one of said plurality of orifices with said discharge end of the water passage for distributing water outwardly from said sprinkler,]*;* and means for retaining said [nozzle selection] *rotatable* sleeve in place.

4. A sprinkler as claimed in claim [3] *1,* wherein said sealing means is an "O" ring.

5. A sprinkler as claimed in claim [3] *1,* wherein said rotatable nozzle housing is cylindrical and includes an outer surface, *and* said [separate] rotatable sleeve is dimensioned so that the outer diameter thereof is substantially equal to the *outer diameter of* said outer surface of said rotatable nozzle housing.

6. A sprinkler as claimed in claim [3] *1,* wherein a portion of said [separate] rotatable sleeve is blank*, and wherein* [so that] said [separate] rotatable sleeve [is] *can be* selectively positioned so that said blank *portion* overlies said discharge end of said water passage whereby said sprinkler is capable of being turned off without turning off the water supply.

7. A sprinkler as claimed in claim 6, wherein said rotatable nozzle housing includes a reduced diameter surface, said inner [diameter] surface of said rotatable sleeve being in slidable relationship with said reduced diameter surface of said rotatable nozzle housing.

8. A sprinkler as claimed in [claims] *claim* 7*, further comprising* [including] a riser assembly operatively connected to said rotatable nozzle housing, said riser assembly including a cylindrical member having an outer diameter, the outer diameter of said [separate] rotatable sleeve being substantially equal to the diameter of said outer diameter of said cylindrical member.

9. A sprinkler as set forth in claim [3] *1,* wherein said rotatable nozzle housing includes indicia on the top indicating the location of each orifice of said plurality of orifices and/or its flow characteristic.

10. A sprinkler as claimed in claim [3] *1,* wherein said [separate] rotatable sleeve is slidably installed from the top of said sprinkler.

11. A sprinkler as claimed in claim 1, wherein said nozzle housing *further* includes an outer surface, *and* gripping means formed on said outer surface to hold said nozzle housing from rotating when said sleeve is rotated.

16. A water sprinkler [having] *comprising:* a riser assembly[,]*;* a drive shaft extending from the top of said riser assembly[,]*;* a nozzle housing assembly[, said nozzle housing assembly ] having a housing connected to said drive shaft for rotation therewith, [said nozzle housing assembly having]

a cylindrical outer surface, *and*

*a flow passage formed therein which has an exit at said cylindrical outer surface; and* a cylindrical nozzle selection sleeve [being] mounted over the outer surface of said housing to rotate therewith and being manually [rotated] *rotatable* relative to said housing, said nozzle selection sleeve having a sleeve wall with a multiplicity of individual nozzles spaced therearound, [said housing having a flow passage therein with an exit at said cylindrical outer surface,] said individual nozzles *having mutually different configurations from each other to produce respectively different flow characteristics and* being positioned on said sleeve wall so that each nozzle becomes aligned with said flow passage exit as the nozzle selection sleeve is rotated.

18. A water sprinkler as claimed in claim 16, *further* including sealing means surrounding said flow passage exit to provide a sealed connection [to] *between the nozzle housing and the selection sleeve around* the pressurized [water] *flow* passage of the nozzle housing *to prevent water exiting the flow passage and through the nozzle aligned with the flow passage exit from leaking.*

20. *A sprinkler as claimed in claim 1, wherein the rotatable sleeve is removably installed on the nozzle housing.*

21. *A water sprinkler as claimed in claim 16, wherein the nozzle selection sleeve is slidably removable from said housing.*

* * * * *